Sept. 8, 1959           O. K. KELLEY           2,903,083
VEHICLE HAVING AUXILIARY TRANSMISSION FOR
THE OPERATION OF ACCESSORIES
Filed Dec. 20, 1954           5 Sheets-Sheet 1

INVENTOR
Oliver K. Kelley
BY C. H. Sikle
ATTORNEY

Sept. 8, 1959

O. K. KELLEY 2,903,083

VEHICLE HAVING AUXILIARY TRANSMISSION FOR
THE OPERATION OF ACCESSORIES

Filed Dec. 20, 1954

INVENTOR
Oliver K. Kelley
BY
C. H. Ditto
ATTORNEY

Sept. 8, 1959               O. K. KELLEY               2,903,083
VEHICLE HAVING AUXILIARY TRANSMISSION FOR
THE OPERATION OF ACCESSORIES Filed Dec. 20, 1954                            5 Sheets-Sheet 5

INVENTOR
Oliver K. Kelley
BY
C. H. Sibbe
ATTORNEY

United States Patent Office 2,903,083
Patented Sept. 8, 1959

2,903,083

VEHICLE HAVING AUXILIARY TRANSMISSION FOR THE OPERATION OF ACCESSORIES

Oliver K. Kelley, Birmingham, Mich., assignor to General Motors Corporation, Detroit, Mich., a corporation of Delaware Application December 20, 1954, Serial No. 476,141

16 Claims. (Cl. 180—53)

This invention concerns an auxiliary transmission system for automotive vehicles which enables the driving of various accessories by the engine of the vehicle at varying speeds different from engine speeds to the end that the horsepower drag on the engine is reduced and the accessories are operated more in accordance with the demand thereon.

Automotive accessories such as the radiator fan, water pump, power steering pump, air conditioning compressor, etc. have heretofore been run at speeds bearing a fixed relation to engine speed. In other words, the greater the engine speed, the faster these accessories have been operated. That this situation represents an undesideratum will be immediately apparent when it is considered that to insure proper performance of the accessories with the engine idling and at low car speeds when the demand thereon is greatest (it is then that the greatest dependence is placed on the radiator fan and water pump; that power steering is most needed, steering resistance being at or near maximum; and that the air conditioning apparatus must work hardest—considering that just as in the case of the radiator, the air conditioning condenser at idle or low car speeds derives little if any advantage from air impact) it has been necessary to operate them at unduly high speeds during other periods, e.g. as when the vehicle is proceeding as during normal highway travel, resulting in a substantial waste of power and premature wearing or break-down of accessory and other parts.

The principal object of the invention is to provide means whereby the accessory devices are driven at a rate substantially consistent with the demand thereon, irrespective of engine speed.

Another object is to provide means for the purpose indicated which is automatic in operation.

A further object is to provide an auxiliary transmission which normally operates the accessories at a speed faster than engine speed when the engine is idling or running at a low speed and which normally operates the accessories at a speed slower than engine speed at other times.

Still another object is to provide an accessory transmission or drive having controls associated therewith serving automatically to overrule or modulate the action of the transmission as desirable under certain conditions.

An additional object is to provide an accessory transmission powered by the crankshaft of the vehicle engine, which transmission acts to overdrive the accessories in relation to crankshaft speed at certain times and which at other times acts to underdrive the accessories in relation to crankshaft speed.

A still further object is to provide an accessory drive including controls which, as determined by vehicle operating conditions, act to automatically vary the point of shift between overdrive and underdrive.

A further object is to provide an accessory drive or transmission which can be produced at a cost making its adoption practicable.

Still another object is to provide an accessory drive comprising hydraulic means for the automatic control thereof.

An additional object is to provide in association with such a drive, means automatically brought into play to remove the load imposed on the engine by an accessory when the demand for engine power is greatest.

A still further object is to provide automatic means whereby the load of an accessory is removed when the engine is being operated under conditions at which the engine coolant tends to approach or reach its boiling point.

Still other objects and features of the invention will become apparent from the subsequent description.

The invention will be specifically described in terms of a preferred embodiment thereof driven from the crankshaft of the engine of the vehicle via belt and pulley. The particular device is especially adapted for installation in a vehicle equipped with an air conditioning system and provides two speeds: one being 1.50 overdrive and the other 0.75 underdrive in relation to crank shaft speed. In the case of this embodiment, there are three conditions of operation which bring about automatic variations in the shift between overdrive and underdrive:

(1) When the air conditioning compressor is off, as determined by the thermostat component of the air conditioning apparatus, and the engine is not overheated, overdrive will be in effect from engine idle to a predetermined higher engine r.p.m., say 650 r.p.m., so that the power steering pump and generator will be running at an effective speed. In one installation tested, the generator at engine idle charges up to 30 amperes, and the power steering pump furnishes suitable oil pressure not only for the power steering gear but also for the operation of the accessory drive unit itself, and up to 1 g.p.m. of oil for the windshield wiper motor, power brakes, window lifts, etc.

(2) When the compressor is on and the engine is not overheated, overdrive will be in effect from idle up to a predetermined still higher engine r.p.m., say 1500 r.p.m., to the end that at low car speeds and at idle a normal size compressor will be adequate. With the compressor on, the fan, water pump, and generator are also driven at overdrive speed to cover the additional load imposed upon them.

(3) Should the engine become overheated, that is should the lower radiator tank at its maximum heat rejection capacity reach about 210° F., and the compressor is either on or off, overdrive will be in effect up to about 2500 engine r.p.m. to speed up the fan and water pump in the indicated car speed range where engine cooling is sometimes critical. It has been found that increased cooling capacity can be thus obtained, even though the higher compressor speed manifestly adds some additional load to the cooling system. When the air conditioning cycle is complete, as marked by automatic turning off of the compressor, the high fan speed continues until the lower radiator tank drops below the selected temperature.

Among special controls incorporated in the auxiliary transmission, as preferably manufactured, is a pair of switches whereby the air conditioning compressor is automatically shut off when the power required from the engine is maximum or when the engine is being operated under conditions giving rise to the development of a maximum amount of heat. An example of maximum engine power demand is represented by the recurring highway situation where a quick pass must be made to avoid collision with an on-coming vehicle. An example of maximum heat development by an engine is represented by a long mountain grade of which there are many in the western part of this country.

With the foregoing as an introduction, the accompanying drawings illustrating the embodiment above generally described will now be identified:

Figure 4:
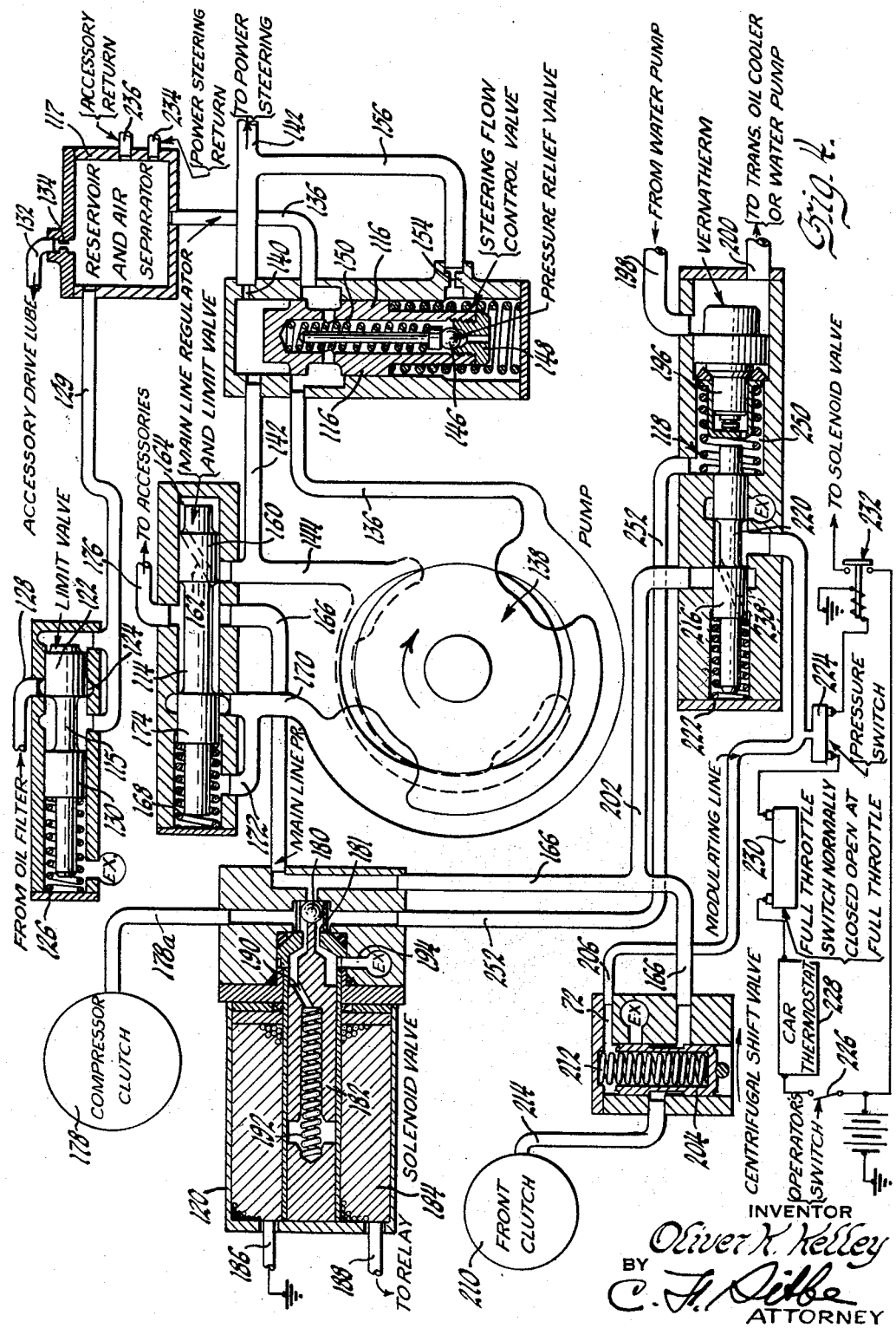
Figure 5:
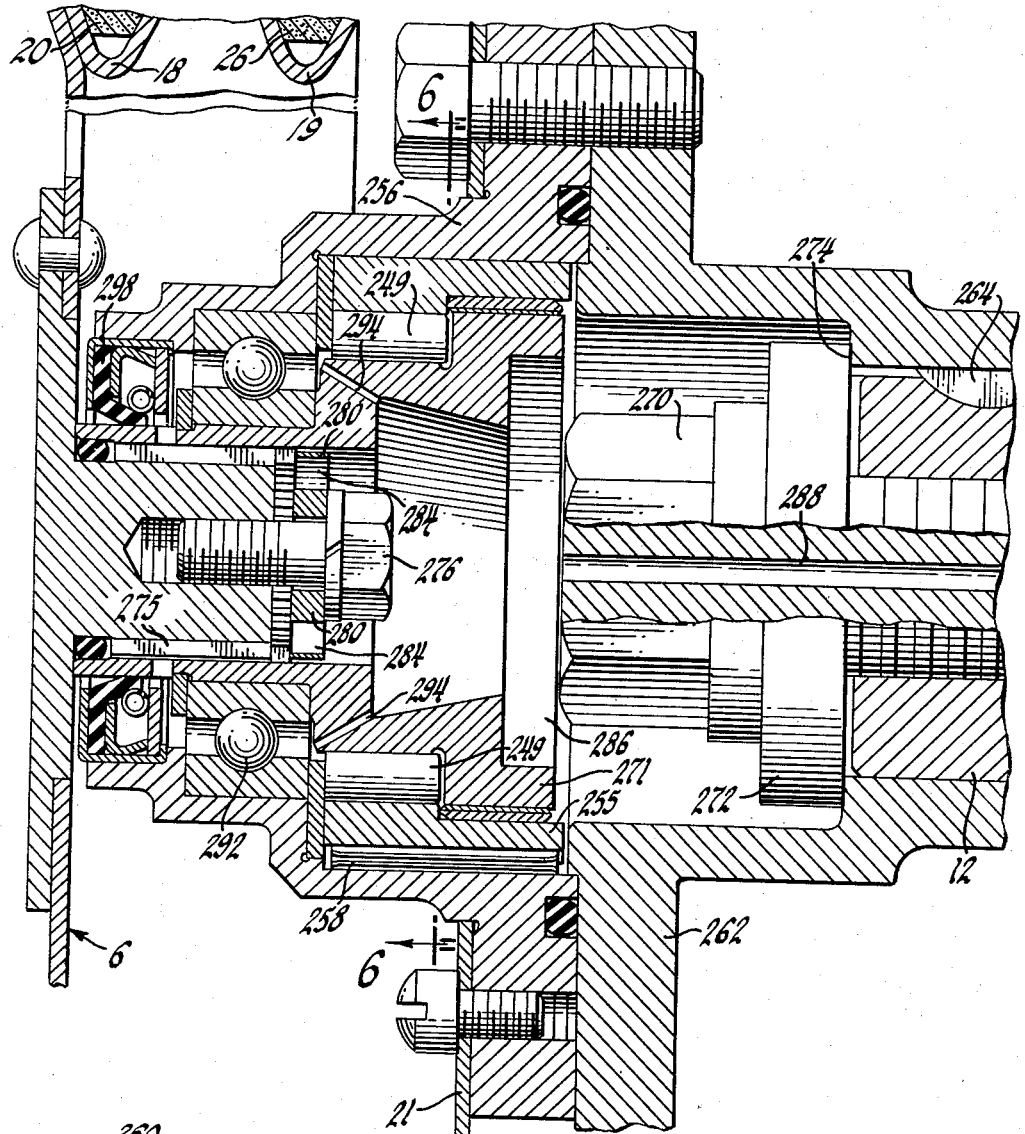
Figure 6:
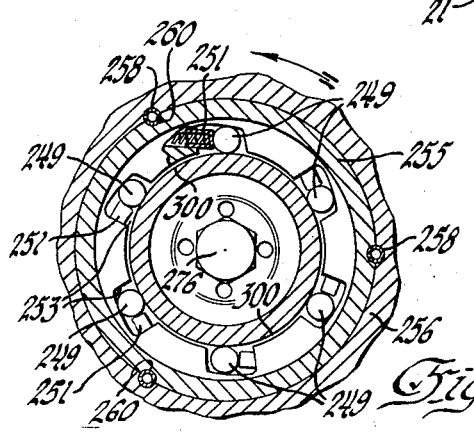

Fig. 4 diagrammatically illustrates the system;

Fig. 5 is a fragmentary section through a free wheel unit forming part of the apparatus, certain other parts also being shown; and Fig. 6 is a section on the line 6—6 in Fig. 5.

Figure 1:
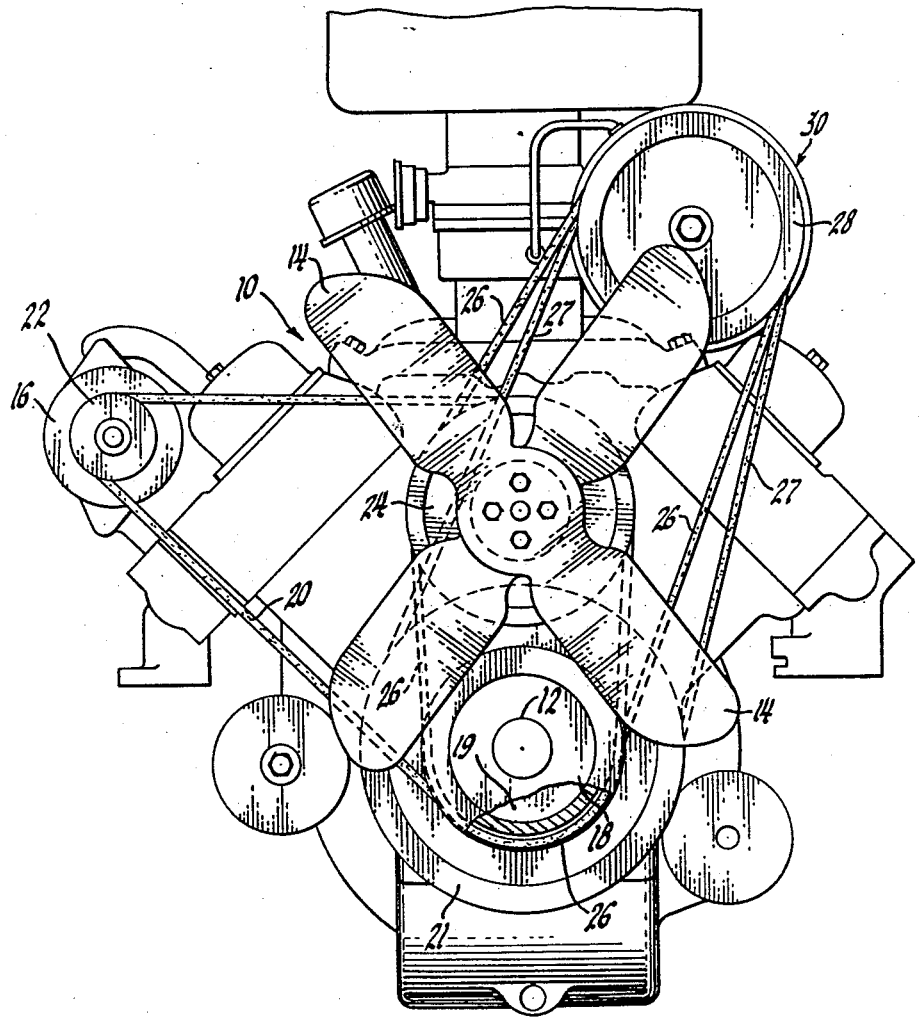
Fig. 1 is a front elevation of a V8 engine showing the apparatus as preferably installed.

Referring first to Fig. 1, the numeral 10 generally indicates a vehicle engine of conventional design having a crankshaft 12. The engine has associated therewith a radiator fan 14, and a generator 16.

Crankshaft 12 has fixed thereto in a manner to be better described later three pulleys including a front pulley 18. This pulley accommodates a belt 20, hereinafter referred to as the "front belt," which also passes about the generator pulley 22 and a pulley 24 through which the fan 14 is rotated. As will be immediately recognized, the belt 20 and the associated pulleys are conventional.

Rearward of the pulley 18 is a second pulley 19 (Fig. 5) formed integral with pulley 18 and grooved to receive a belt 26, hereinafter referred to as the "center belt," which also encircles a pulley 28 (Fig. 2) forming part of the accessory drive unit 30. A pulley 32 positioned immediately behind pulley 28 has a diameter slightly less than that of the latter pulley in order to achieve the drive ratios previously indicated herein. A "rear" belt 27 passing around the pulley 32 operatively connects such pulley with a pulley 21 associated with the crankshaft 12.

Pulley 28 is shown riveted to the flange portion 34 of a sleeve 36 adapted to turn within a bushing 38. A shaft 40 to which the sleeve 36 is splined terminates at its forward end in a stud 42 on which a nut 44 securing the sleeve is threaded.

Also splined to the shaft 40, just inward of sleeve 36, is a carrier 46 for a clutch plate 48. Beyond the clutch carrier 46 and centrally of the accessory drive proper, shaft 40, enlarged in this area, turns in a bushing 50 held within the boss portion 51 of a fixed partition piece 53. The shaft 40 rightward of the bushing 50 has splined thereto the rotor 52 of a vane type pump (see Fig. 3) to be subsequently described in greater detail. An axial bore 81 in shaft 40 serves in the transfer of lubricating fluid.

A second clutch carrier 54 is splined to the shaft 40 at its end opposite the pulleys 28, 32. Clutch plate 56 like plate 48 is axially movable by virtue of the splining indicated at 58. The carrier 54 turns in a bushing 55 supported by the boss portion 59 of a second fixed partition piece 57.

The clutch 54, 56, as will later appear, has relation to the compressor of the air condition system, the same being engaged when the compressor is in operation.

Reverting to pulley 32, it will be noted that the same is riveted to the flange portion 62 of a sleeve 64, surrounding bushing 38 and having splined thereto a backing plate 66 for the clutch plate 48. At the opposite side of the plate 48 is an annular piston 70 mounted within a carrier 74 and hydraulically actuable to bring about engagement of the clutch. The control for the clutch is provided by a valve 72 which operates as subsequently described. This valve is housed within the carrier 74 which is connected to turn with plate 66 and rotates on a bushing 76 supported by the previously-mentioned boss portion 51 of partition member 53. This boss portion will be seen as grooved to accommodate a plurality of annular oil seals 80. Flexible seals 82 interconnecting the carrier 74 and piston 70 prevent escape of fluid about the piston.

Partition 53 serves as the front portion of the housing for the rotor 52, while partition member 57, which is fitted into the pump ring 88, serves as the back portion of the rotor housing. Plugs 84 close oil passageways in the partition 53.

The boss portion 59 of the partition 57 mounts a bushing 96, and is grooved to accommodate oil seals 94. A carrier 98 is adapted to turn on the bushing and is recessed to receive an annular piston 100 similar to the piston 70.

Shaft 102, which is the drive shaft of the air conditioning compressor, has splined thereto the right-hand component 104 of the back clutch. A threaded stud 106 received in the end of the shaft secures the part 104 to the shaft.

At 108 is indicated a spring loaded seal serving to prevent escape of gas from the compressor 110. This seal is old in the art and accordingly need not be described in any detail here.

Figure 2:
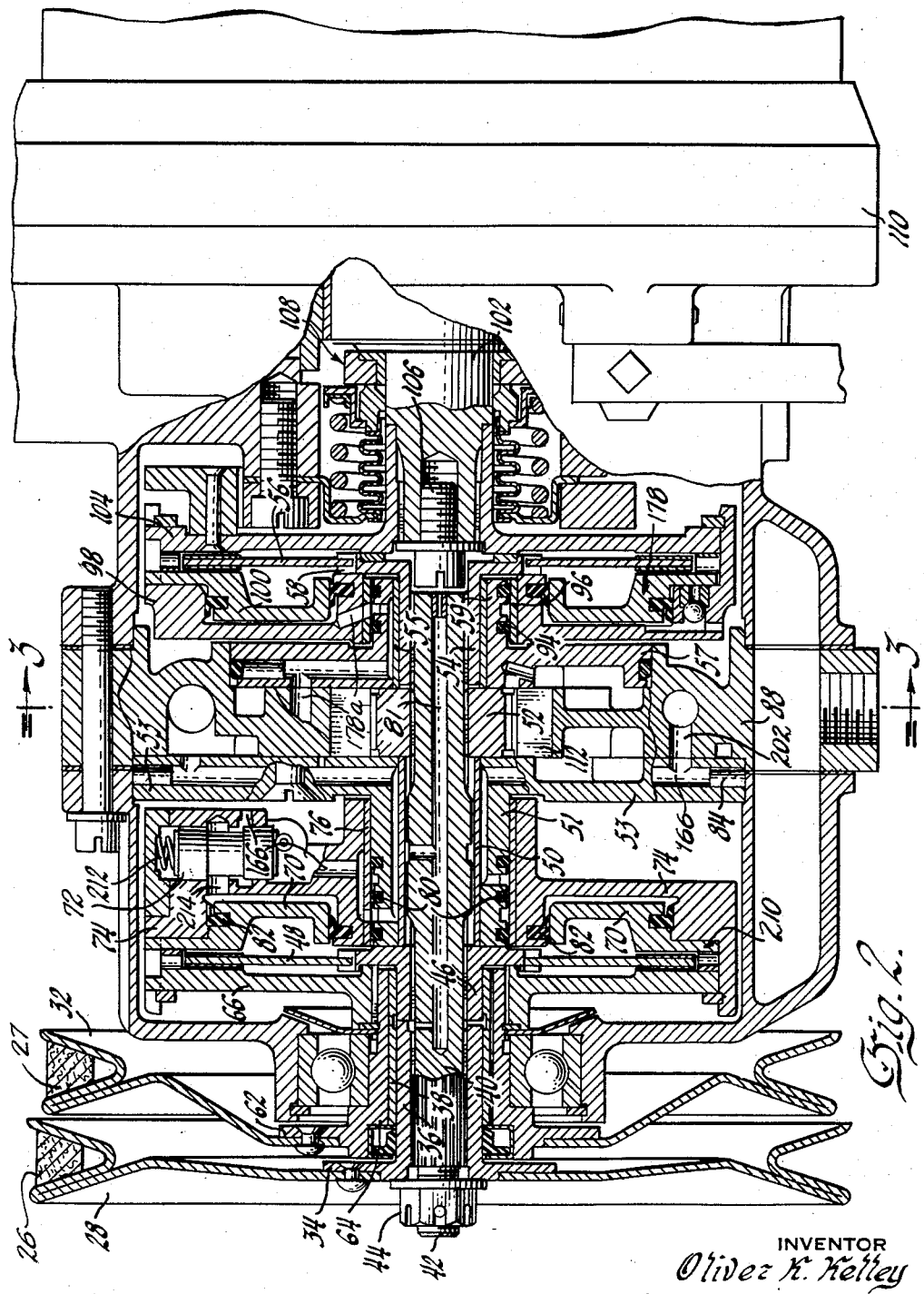
Fig. 2 shows the accessory drive mechanism in longitudinal section.

Various of the parts shown in Fig. 2 will be observed as bored or formed to provide oil passageways 166, 178a, 202, and 214. The purpose of these passageways will be clear from the subsequent description particularly that portion thereof referring to the diagram of Fig. 4. First, however, reference should be made to Fig. 3, wherein the pump rotor 52 is shown as carrying a plurality of vanes 112 maintained in engagement with the inner contour 113 of the pump ring 88 by discharge pressure admitted at 111 back of the vanes. The operation of such pumps is well understood in the art; hence, here again, a detailed description appears unnecessary. Suffice it to say that as the rotor 52 rotates clockwise, oil is drawn into the pump as the vanes 112 move radially outwardly and is discharged as the vanes move radially inwardly. The purpose of the valves 114, 116, 118, and valve 120, which is solenoid controlled, will be explained in connection with the description of Fig. 4.

Although no criticality is attached thereto, it is convenient for the purposes of the invention to draw the necessary oil from the engine lubricating system, preferably from the engine oil filter. It has been found that when the engine lubricating oil pressure is of the order of 30 p.s.i. and the air conditioning compressor is running, less than one quart per minute is sufficient and does not represent too much of a drain, especially if the vehicle is equipped with an automatic transmission which keeps the engine from lugging at high torque and low speed. It is a particular feature of the invention that the withdrawn oil is employed not only in the operation of the steering gear, the pump component of which is made an integral part of the accessory drive, but also in the operation of the hydraulic controls whereby the shift from underdrive to overdrive and vice versa is accomplished and in the lubrication of the drive itself.

Referring now to Fig. 4, at the top of such figure there will be seen a valve 115, not clearly shown in any of the other figures, which serves to hold the pressure in the reservoir and air separator 117 at 15 p.s.i.—representing an arbitrary rather than a critical value. It will be understood that so long as the land 122 is in a position to the right of the annulus 124 oil is admitted to the reservoir 117. However, should the pressure in the reservoir become greater than 15 p.s.i. the valve spool will be shifted to the left against the resistance of the spring 126 and the passageway 128, 129 will be closed. Spring 126 is carefully gauged in relation to the area for hydraulic reaction represented by the right-hand end wall of the land 122 to obtain the indicated results. Oil bleeding past the land 130 into the chamber housing spring 126 exhausts to the crankcase of the engine of the vehicle.

Lubrication of the accessory drive is accomplished with oil withdrawn from the reservoir 117 via a line 132 having an orifice 134 therein serving as a flow control.

A line 136 extends to the suction side of the power steering pump, generally indicated by the numeral 138. Disposed in this line is a portion of the above-mentioned valve 116 which is bi-functional in that it serves both as a flow control and as a relief valve. Thus, should the quantity of oil passing the orifice 140 in the power steering pressure line 142, which branches from the pump discharge line 144, exceed say one gallon per minute the resulting pressure build-up in the line 142 will displace the valve 116 downwardly so that the excess oil is by-passed to the pump suction line 136.

A ball 146 within the spool of valve 116 tends to be held on its seat 148 by a spring 150. This spring is carefully gauged to yield to upward movement of the ball should the fluid pressure therebelow reach a predetermined value. Fluid enters the chamber below the ball via a line 156 which represents a branch of line 142 extending to the power steering mechanism. An orifice 154 in the line 156 has a diameter such that so long as the pressure in the line 142 is not excessive the pressure in the valve chamber will not dislodge the ball. Should, however, the pressure in the line 142 become excessive, i.e. capable of doing damage to one or more components of the power steering mechanism, the resulting increase in the fluid pressure in the valve chamber will elevate the ball against the resistance of the spring 150, opening line 142 to the pump intake or suction line 136.

The previously-mentioned valve 114 seen in Fig. 4 immediately above the pump 138 operates to maintain the line pressure to the hydraulic controls at a selected value—125 p.s.i. in the case of the particular embodiment of the invention. This valve includes a land 160 provided with a diagonal bore 162 allowing for the passage of oil into the chamber 164. Whenever the pressure in the line 166 to the controls becomes in excess of the indicated value, the pressure of the fluid in the chamber 164 acts to shift the valve spool to the left thereby to close the pump discharge line 144. The shifting of the valve spool is against the resistance of a spring 168 which is carefully gauged to yield at the stated pressure. It is to be observed that the inner annular vertical surfaces of the lands 160 and 174 hydraulically balance each other and that accordingly there is no resistance other than the spring 168 to leftward displacement of the spool. The reaction surfaces provided by the land 160 within the chamber 164 will be seen equal to the diameter of the land.

Line 170 connecting with the chamber housing the spring 168 via a branch line 172 represents a means of recovering fluid bleeding past the land 174. Line 176 should be considered as extending to valves controlling fluid motors associated with the windshield wipers, window lift mechanisms, seat adjustors, etc.

Figure 3:
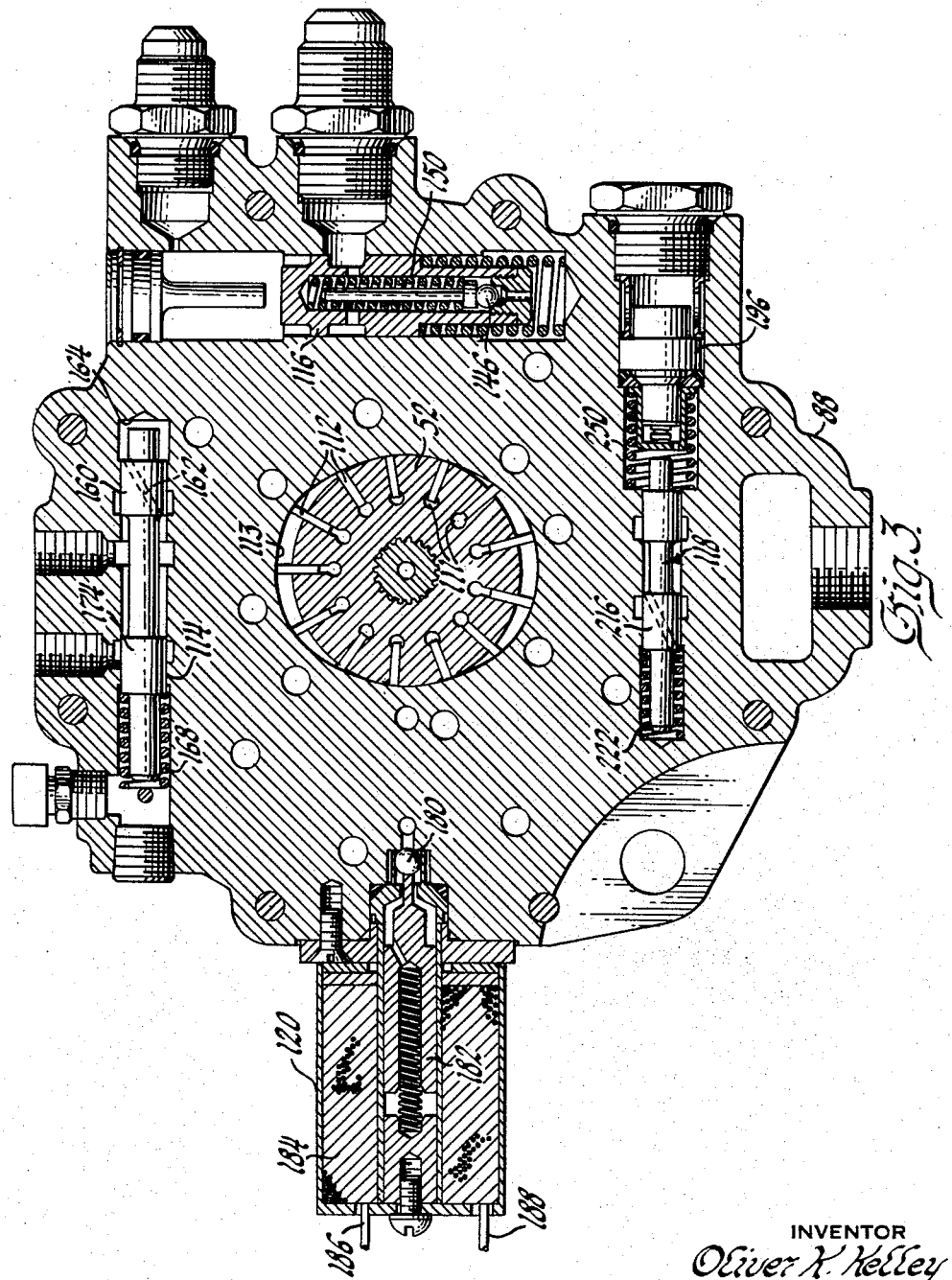
Fig. 3 is a section on the line 3—3 of Fig. 2.

The control of the compressor clutch 178, including the parts 56, 100, and 104 (Fig. 2) is accomplished by means of the previously-mentioned solenoid valve 120, having leads 186 and 188 (Fig. 3). This valve includes a ball 180 positioned as shown to block the flow of pressure fluid from line 166 into line 178a extending to the compressor clutch, more specifically to the area back of the annular piston 100, unless the electric circuit including the compressor is energized, in which event the armature plunger 182 is pulled inwardly of the coil 184 and the ball seat at 181. The armature plunger 182 has therein an orifice 190 allowing for the egress of fluid collecting in the chamber housing the spring 192, which spring acts through the plunger to restore the ball 180 to its normal position on de-energization of the coil 184. Exhaust line 194 provides for return of fluid to the engine crankcase.

The previously-mentioned valve 118 (see also Fig. 3) has relation to the transfer of heat from the engine coolant and includes a thermostatic device 196 of the type sold under the trade name "Vernatherm." Such a device will be found described in Albright Patent 2,534,497. Advantageously, the coolant passing the thermostatic device (lines 198 and 200) is derived from the coolant pump outlet as indicated. It may be returned, for example, either to the coolant pump suction, or if the vehicle is equipped with an automatic transmission, to the transmission oil cooler. The operation of valve 118 will be described following description of the operation of valve 72 (Fig. 3) which appears in Fig. 4 at the lower left.

The position of the spool component 204 of valve 72 is a function of the fluid pressure in line 206 and the centrifugal force acting upon the spool, which as before explained is housed within the constantly rotating carrier 74 (Fig. 2). Assuming that the engine is idling or that the vehicle is traveling at low speed, the fluid passes the valve spool to enter line 214 and the space behind the annular piston 70 (Fig. 2) thus actuating the front clutch indicated at 210 in Fig. 4 and which includes the plate 48. On an increase in car speed to a point as previously indicated herein, the valve spool is thrown outwardly against the resistance of the spring 212 so that fluid is prevented from entering the line 214 to the clutch, which consequently is released.

Line 206 as shown in Fig. 4 extends from the "Vernatherm" valve 118, which receives fluid from the main line 166 via a branch line 202. The position of the land 216 controlling the flow of the pressure fluid from line 202 into line 206 is a function of the temperature of the coolant cycling through lines 198 and 200. Assuming that the temperature of the fluid is of the order of 210° F.+, for instance, the thermostatic device 196 will expand to shift the valve spool 220 to the left thereby to admit pressure fluid above the spool of valve 72 from the line 206. The effect of this is to increase the quantum of centrifugal force necessary to displace the spool so as to disengage the front clutch. In other words, when the coolant temperature is excessive, the accessory drive tends to stay in overdrive longer than otherwise. Once the coolant temperature falls to normal the thermostatic device 196 contracts so that the spring 222 is permitted to shift the spool 220 inwardly to close off the line 202. The resistance the spring 222 must overcome is increased should the compressor clutch be engaged, since in that case the chamber 250 is filled with fluid under line pressure—note line 252. With this arrangement as will be readily seen, the accessory drive will remain in overdrive still longer when the compressor is in operation, and the radiator fan and water pump will continue to run fast to compensate for the load imposed by the compressor on the engine.

Fluid collecting in the chamber housing the spring 222 bleeds out through the diagonally disposed orific 238.

There will be seen disposed in the line 206 a pressure switch 224. This switch is gauged to open at a predetermined pressure reflecting maximum leftward displacement of the land 216 by the thermostatic device 196 and maximum need for engine cooling—80 p.s.i. in the instance of the particular embodiment. Opening of the switch 224 results in shutting off of the air conditioning compressor, the switch being in series circuit with the coil 184. With this scheme the load of the compressor is removed when the need for engine cooling is maximum, as is manifestly desirable.

The circuit including the pressure switch 224 and the coil 184 also includes in series therewith a manual switch 226 used chiefly to disconnect the air conditioning system as in winter time, an automatic thermostatically controlled switch 228, operating to turn the compressor off and on as determined by the temperature within the vehicle, and a micro-switch 230 controlled from the carburetor in a manner which will be obvious to those skilled in the art and operating to remove the load of the compressor when the power demanded from the engine is maximum.

The coil of relay 232 which is normally open is electrically connected with the vehicle frame. Accordingly, when the switch 228, which senses the vehicle temperature, closes, and assuming switches 224 and 230 are closed; the relay closes and holds, causing energization of coil 184 and engagement of the compressor clutch.

From the upper right-hand portion of the diagram, it will be noted that the fluid from both the power steering mechanism and the accessories such as the windshield wiper motor is returned to the reservoir and air separator 117, the return being through lines 234 and 236, respectively. As will be well understood, the power steering mechanism contemplated comprises, in addition to the pump 138, a fluid motor working on a steering member and a valve for controlling the flow of fluid to and from the motor, neither shown. A typical mechanism which has been found satisfactory is disclosed in Davis Patent 2,213,271.

A free wheel device such as illustrated by Figs. 5 and 6 is a necessary component of the particular system. This device is associated with the crankshaft 12 (Figs. 5 and 6) and includes cam rollers 249 and springs 251. The rollers and springs are disposed in recesses 253 formed in a driving member 255 made secure to a flange member 256 by means of roll pins 258 seated in grooves 260 and in complementary grooves in the flange member 256. The inner walls of the recesses 253 are formed as ramps, as is customary in such devices. Springs 251 urge the rollers toward the low ends of the ramps. Flange 256 to which the driving member is fastened finds its complement in flange 262, bolted to flange 256. A key 264 integrates the flange piece 262 with the crankshaft 12. Thus, the pulley 21 mounting the fast running belt 27, together with the two flange pieces and the driving member 255, constitute one functional unit, joined to the crankshaft 12.

The connection just described further comprises a bolt 270 which is threaded into the end of the crankshaft to hold a retaining washer 272 against a shoulder 274 provided by the flange piece 262.

Pulley 18 and with it pulley 19, these pulleys being integrally formed, are connected to a race piece 271 within the driving member 255 via splining 275. A washer 280 is held against the inner ends of the splines formed in the race piece by a bolt 276 threaded into the hub of the double pulley. Apertures 284 in washer 280 permit the ingress of lubricating fluid from the chamber 286, fed through a passageway made up of a bore 288 in the bolt 270 and a bore, not shown, in the crankshaft 12. Ball bearing 292 is also lubricated from the chamber 286, passageways 294 being provided in the race piece 271 for this purpose. The peculiar inner conformation of the race piece facilitates lubrication of the bearing. Oil seal 298 serves an obvious purpose.

Reverting to Fig. 1 in order to briefly summarize the operation of the accessory drive, it is to be understood that at highway cruising speeds, for example, the power steering pump and the air conditioning compressor, assuming the latter is on, are driven through the center or slow-running belt 26 (corresponding to pulley 28 in Fig. 2). Belt 26 is propelled by pulley 19 fixed to the inner race member 271 receiving torque from the driving member 255 through the rollers 249. At the indicated speeds, valve 72 is closed; hence the front clutch is disengaged and pulley 32, mounting the rear or "fast running" belt 27, sleeve 64, back up plate 66, and carrier 74 merely idle with relation to the accessory drive. Now assuming that the speed of the vehicle, more accurately the engine speed, drops to a point bringing the overdrive into effect, spring 212 (Fig. 2) will force the valve 72 radially inwardly so that pressure fluid enters the chamber back of the annular piston 70 to cause the same to actuate the front clutch, whereafter the two pulleys 28 and 32 run at the same speed. The center belt 26, of course, drives its crankshaft pulley 19, with the accessory drive in overdrive, faster than the engine, but it is manifestly free to do this because of the free wheeling unit above described. Since the front belt 20 is necessarily driven at the same speed as the center belt the fan, water pump, and generator are also driven at overdrive speed on engagement of the front clutch.

With the air conditioning compressor on, as assumed, ball 180 (Fig. 4) is held displaced to the left so that pressure fluid is introduced in the chamber 250 where it tends to force the spool 220 to the left, opening line 202 to line 206 extending to the centrifugal shift valve 72. The fluid thus admitted to the latter valve acts to supplement the action of the spring 212 with the result that as the speed of the vehicle decreases, the front clutch, which brings the fast-running belt 27 into play, becomes engaged sooner than is the case when the compressor is off. Under the latter condition, no fluid is admitted to the chamber 250 and land 216 remains in its shown position, blocking the flow of pressure fluid into the modulating line 206.

The foregoing contemplates normal engine operating temperatures. Should the engine temperature increase beyond the predetermined point, the thermostatic device 196, whether the compressor is on or off, will operate to displace the spool 220 leftwardly to open up the modulating line to pressure line 202. Accordingly, valve 72 shifts to energize the front clutch at an engine speed which is relatively high, even as compared to the situation when the compressor is on, in order to bring about faster operation of the radiator fan and water pump. In the event the coolant temperature continues to increase despite the high speed operation of the radiator fan and the water (or coolant) pump, the developing pressure in line 206 brings about opening of pressure switch 224, resulting in de-energization of the solenoid circuit. With the load of the compressor removed, the coolant temperature soon becomes restored to normal.

The load of the compressor is also removed in any situation where the vehicle accelerator is fully depressed, this being a function of the full throttle switch 230 which is also in circuit with the solenoid 120. Thus, the horse power normally sacrificed in the interest of the compressor is applied to obtain the desired maximum engine performance.

Having thus described and illustrated my invention, what I claim is:

1. In a vehicle, the combination with a power plant and an accessory device of an assemblage through which said power plant drives said accessory device, said assemblage comprising: first and second power transmission members having separate connections with said power plant, said first member being operated at a different speed than said second member, clutch means between said members, power transmitting means connecting said accessory to one of said power transmission members, an element responsive to the speed of operation of said power plant for effecting engagement and disengagement of said clutch means, free wheel means associated with said power plant and one of said power transmission members whereby on engagement of said clutch means said power plant is enabled to drive one of said power transmission members through the other, and means responsive to a vehicle condition other than the speed of operation of said power plant for modulating the action of said speed-responsive element.

2. In a vehicle, the combination with a power plant of an accessory device and an assemblage through which said power plant drives said accessory device, said assemblage comprising: drive means for said device, first and second power transmission means having separate connections with a take-off from said power plant, said first means being operated at a different speed than said second means, said second means being operably connected to said drive means, clutch means between said first means and said drive means, means controlled by a predetermined engine operating condition for effecting engagement and disengagement of said clutch means, and free wheel means between said first and second means whereby on engagement of said clutch means said second means idles while said power plant drives said device at said different speed through said first means.

3. In a vehicle, the combination with a power plant of an accessory device and an assemblage through which said power plant drives said accessory device, said assemblage comprising: drive means for said device, first and second power transmission means having separate connections with a take-off from said power plant, said first means being operated at a different speed than said second means, said second means being operably connected to said drive means, clutch means between said first means and said drive means, means responsive to the speed of operation of said power plant for effecting engagement and disengagement of said clutch means, and free wheel means between said first and second means whereby on engagement of said clutch means said second means idles while said power plant drives said device at said different speed through said first means.

4. In a vehicle, the combination with a power plant of an accessory device and an assemblage through which said power plant drives said accessory device, said assemblage comprising: drive means for said device, first and second power transmission means having separate connections with a take-off from said power plant, said first power transmission means being operated at a different speed than said second power transmission means, said second power transmission means being operably connected to said drive means, a source of fluid under pressure, fluid-actuable clutch means between said first power transmission means and said drive means and in fluid circuit with said source, a valve in the circuit between said clutch means and said source, a carrier mounted to move with said first power transmission means and supporting said valve, the latter bringing about engagement and disengagement of said clutch means as determined by the speed of operation of said carrier, and free wheel means between said first power transmission means and said second power transmission means whereby on engagement of said clutch means said second power transmission means idles while said power plant drives said device at said different speed through said first power transmission means.

5. In a vehicle, the combination with a power plant of first and second accessory devices and an assemblage comprising: drive means for said first device, first and second power transmission means having separate connections with a take-off from said power plant, a free wheel mechanism between said power transmission means including a first part connected to said first power transmission means and a second part connected to said second power transmission means, said first power transmission means being operated at a different speed than said second power transmission means, said second power transmission means being operably connected to said drive means, clutch means between said first power transmission means and said drive means, third power transmission means connecting said second device to said second part and a member responsive to the speed of operation of said power plant for effecting engagement and disengagement of said clutch means, said assemblage being characterized in operation in that upon engagement of said clutch means said first device is driven at said different speed by said first power transmission means while said second device is driven at such speed by said second power transmission means through said third power transmission means, said second power transmission means with said clutch engaged idling with reference to said power plant.

6. In a vehicle, the combination with a power plant of first and second accessory devices and an assemblage comprising: drive means for said first device, first and second power transmission means having separate connections with a take-off from said power plant, a free wheel mechanism between said power transmission means including a first part connected to said first power transmission means and a second part connected to said second power transmission means, said first power transmission means being operated at a different speed than said second power transmission means, said second power transmission means being operably connected to said drive means, a source of fluid under pressure, fluid-actuable clutch means between said first power transmission means and said drive means and in fluid circuit with said source, third power transmission means connecting said second device to said second part, a valve in the circuit between said clutch means and said source, and a carrier mounted to move with said first power transmission means and supporting said valve, the latter bringing about engagement and disengagement of said clutch means as determined by the speed of operation of said carrier, said assemblage being characterized in operation in that upon engagement of said clutch means said first device is driven at said different speed by said first power transmission means while said second device is driven at such speed by said second power transmission means through said third power transmission means, said second power transmission means with said clutch engaged idling with reference to said power plant.

7. In a vehicle, the combination with a power plant of an accessory device and an assemblage through which said power plant drives said accessory device, said assemblage comprising: rotary drive means for said device, first and second power transmission means having separate connections with a take-off from said power plant, said first power transmission means being operated at a different speed than said second power transmission means, said second power transmission means being operably connected to said drive means to rotate the same, a source of fluid under pressure, fluid-actuable clutch means between said first power transmission means and said drive means and in fluid circuit with said source, a valve in the circuit between said clutch means and said source, a carrier mounted to rotate with said first power transmission means and supporting said valve, the latter bringing about engagement and disengagement of said clutch means as determined by the centrifugal force to which it is subjected, free wheel means between said first power transmission means and said second power transmission means whereby on engagement of said clutch means said second power transmission means idles while said power plant drives said device at said different speed through said first power transmission means, and means responsive to a vehicle condition other than the speed of operation of said power plant for modulating the action of said valve.

8. In a vehicle, the combination with a power plant of first and second accessory devices and an assemblage comprising: rotary drive means for said first device, first and second power transmission means having separate connections with a take-off from said power plant, a free wheel mechanism between said power transmission means including a first part connected to said first power transmission means and a second part connected to said second power transmission means, said first power transmission means being operated at a different speed than said second power transmission means, said second power transmission means being operably connected to said drive means, a source of fluid under pressure, fluid-actuable clutch means between said first power transmission means and said drive means and in fluid circuit with said source, third power transmission means connecting said second device to said second part, a valve in the circuit between said clutch means and said source, and a carrier mounted to rotate with said first power transmission means and supporting said valve, the latter bringing about engagement and disengagement of said clutch means as determined by the centrifugal force to which it is subjected, the engagement of said clutch being marked by idling of said second power transmission means with reference to said power plant, driving of said second device at said different speed by said second power transmission means through said third power transmission means and driving of said first device at such speed by said first power transmission means, and means responsive to a vehicle condition other than the speed of operation of said power plant for modulating the action of said valve.

9. In a vehicle, the combination with a power plant of an accessory device and an assemblage through which said power plant drives said accessory device, said assemblage comprising: drive means for said device, first and second power transmission means having separate connections with a take-off from said power plant, said first power transmission means being operated at a different speed than said second power transmission means, said second power transmission means being operably connected to said drive means, a pump connected to a source of fluid and serving an accessory extraneous of the assemblage, fluid-actuable clutch means between said first power transmission means and said drive means and in fluid circuit with said pump, a valve in the circuit between said clutch means and said pump, a carrier mounted to move with said first power transmission means and supporting said valve, the latter bringing about engagement and disengagement of said clutch means as predetermined by the speed of operation of said carrier, and free wheel means between said first power transmission means and said second power transmission means whereby on engagement of said clutch means said second power transmission means idles while said power plant drives said devices at said different speed through said first power transmission means.

10. In a vehicle, the combination with a power plant of first and second accessory devices and an assemblage comprising: drive means for said first device, first and second power transmission means having separate connections with a take-off from said power plant, a free wheel mechanism between said power transmission means including a first part connected to said first power transmission means and a second part connected to said second power transmission means, said first power transmission means being operated at a different speed than said second power transmission means, said second power transmission means being operably connected to said drive means, a pump connected to a source of fluid and serving an accessory extraneous of the assemblage, fluid-actuable clutch means between said first power transmission means and said drive means and in fluid circuit with said pump, third power transmission means connecting said second device to said second part, a valve in the circuit between said clutch means and said pump, and a carrier mounted to move with said first power transmission means and supporting said valve, the latter bringing about engagement and disengagement of said clutch means as determined by the speed of operation of said carrier, said assemblage being characterized in operation in that upon engagement of said clutch means said first device is driven at said different speed by said first power transmission means while said second device is driven at such speed by said second power transmission means through said third power transmission means, said second power transmission means with said clutch engaged idling with reference to said power plant.

11. In a vehicle, the combination with a power plant of an accessory device and an assemblage through which said power plant drives said accessory device, said assemblage comprising: drive means for said device, first and second power transmission means having separate connections with a take-off from said power plant, said first means being operated at a different speed than said second means, said second means being operably connected to said drive means, clutch means between said first means and said drive means, means controlled by a predetermined engine operating condition for effecting engagement and disengagement of said clutch means, free wheel means between said first and second means whereby on engagement of said clutch means said second means idles while said power plant drives said device at said different speed through said first means, and means controlled by a predetermined vehicle operating condition for modulating the action of said means for effecting engagement and disengagement of said clutch means.

12. In a vehicle, the combination with a power plant having a cooling system of an accessory device and an assemblage through which said power plant drives said accessory device, said assemblage comprising: drive means for said device, first and second power transmission means having separate connections with a take-off from said power plant, said first means being operated at a different speed than said second means, said second means being operably connected to said drive means, clutch means between said first means and said drive means, means responsive to the speed of operation of said power plant for effecting engagement and disengagement of said clutch means, free wheel means between said first and second means whereby on engagement of said clutch means said second means idles while said power plant drives said device at said different speed through said first means, and means responive to the temperature of the coolant employed in said cooling system for modulating the action of said means for effecting engagement and disengagement of said clutch means.

13. In a vehicle, the combination with a power plant having a cooling system of an accessory device and an assemblage through which said power plant drives said accessory device, said assemblage comprising: drive means for said device, first and second power transmission means having separate connections with a take-off from said power plant, said first power transmission means being operated at a higher speed than said second power transmission means, said second power transmission means being operably connected to said drive means, a source of fluid under pressure, fluid-actuable clutch means between said first power transmission means and said drive means and in fluid circuit with said source, a valve in the circuit between said clutch means and said source, a spring associated with said valve and tending to displace the same to open position, a carrier mounted to move with said first power transmission means and providing a chamber within which said valve and spring are housed, said spring by opening said valve normally bringing about engagement of said clutch means on the occurrence of a predetermined reduction in the speed of operation of said carrier, freewheel means between said first power transmission means and said second power transmission means whereby on engagement of said clutch means said second power transmission means idles while said power plant drives said device at said higher speed through said first power transmission means, a second valve in circuit with said source and with said first valve, and a thermosensitive element exposed to the temperature of the coolant employed in said cooling system and controlling said second valve, displacement of said second valve to open position being marked by the flow of pressure fluid to said chamber where such fluid supplements the action of said spring so that said first valve becomes displaced to effect engagement of said clutch means at a carrier speed higher than said predetermined carrier speed.

14. In a vehicle, the combination with a power plant having a cooling system of first and second accessory devices and an assemblage comprising: drive means for said first device, first and second power transmission means having separate connections with a take-off from said power plant, a free wheel mechanism between said power transmission means including a first part connected to said first power transmission means and a second part connected to said second power transmission means, said first power transmission means being operated at a higher speed than said second power transmission means, said second power transmission means being operably connected to said drive means, a source of fluid under pressure, fluid-actuable clutch means between said first power transmission means and said drive means and in fluid circuit with said source, third power transmission means connecting said second device to said second part, a valve in the circuit between said clutch means and said source, a spring associated with said valve and tending to bias the same toward open position, a carrier mounted to move with said first power transmission means and providing a chamber within which said valve and spring are housed, said spring by opening said valve normally bringing about engagement of said clutch means on the occurrence of a predetermined reduction in the speed of operation of said carrier, engagement of said clutch means being marked by idling of said second power transmission means with reference to said power plant, driving of said second device at said higher speed by said second power transmission means through said third power transmission means and driving of said first device at such speed by said first power transmission means, a second valve in circuit with said source and with said first valve, a thermosensitive element exposed to the temperature of the coolant employed in said cooling system and controlling said second valve, displacement of said second valve to open position being accompanied by the flow of pressure fluid to said chamber where such fluid supplements the action of such spring so that said first valve becomes displaced to effect engagement of said clutch means at a carrier speed higher than said predetermined carrier speed.

15. In a vehicle, the combination with a power plant of an accessory device and an assemblage through which said power plant powers said accessory device, said assemblage comprising: drive means for said device, clutch means between said drive means and said device, first and second power transmission means having separate connections with a take-off from said power plant, said first power transmission means being operated at a different speed than said second power transmission means, said second power transmission means being operably connected to said drive means, clutch means between said first power transmission means and said drive means, means controlled by predetermined vehicle operating conditions for effecting engagement and disengagement of said two clutch means and free wheel means between said first power transmission means and said second power transmission means whereby on engagement of the clutch means between said first power transmission means and said drive means said second power transmission means idles while said power plant drives said device at said different speed through said first power transmission means when said first-mentioned clutch means is engaged.

16. In a vehicle, the combination with a power plant of an accessory device and an assemblage through which said power plant powers said accessory device, said assemblage comprising: drive means for said device, first fluid-actuable clutch means between said drive means and said device, first and second power transmission means having separate connections with a take-off from said power plant, said first power transmission means being operated at a different speed than said second power transmission means, said second power transmission means being operably connected to said drive means, a source of fluid under pressure circuited with said first fluid-actuable clutch means, a solenoid valve in such fluid circuit, an electric circuit including said solenoid valve, switch means in said electrical circuit for controlling the operation of said solenoid valve, said switch means being responsive to a vehicle operating condition, second fluid-actuable clutch means between said first power transmission means and said drive means, said second fluid-actuable clutch means being in fluid circuit with said source, valve means in said last fluid circuit responsive to the speed of operation of said power plant and controlling said second fluid-actuable clutch means and free wheel means between said first power transmission means and said second power transmission means whereby on engagement of said second fluid-actuable clutch means said second power transmission means idles while said power plant drives said device at said different speed through said first power transmission means when said first fluid-actuable clutch means is engaged.

References Cited in the file of this patent
UNITED STATES PATENTS

| | | |
|---|---|---|
| 1,983,827 | Winther et al. | Dec. 11, 1934 |
| 2,056,050 | Harris | Sept. 29, 1936 |
| 2,266,164 | Claytor | Dec. 16, 1941 |
| 2,430,799 | Aspinwall | Nov. 11, 1947 |
| 2,467,077 | Brunken | Apr. 12, 1949 |
| 2,482,460 | Browne | Sept. 20, 1949 |
| 2,682,928 | Dean et al. | July 6, 1954 |